(No Model.) 2 Sheets—Sheet 1.
W. G. COLLINS.
PNEUMATIC TUBE.
No. 555,077. Patented Feb. 25, 1896.
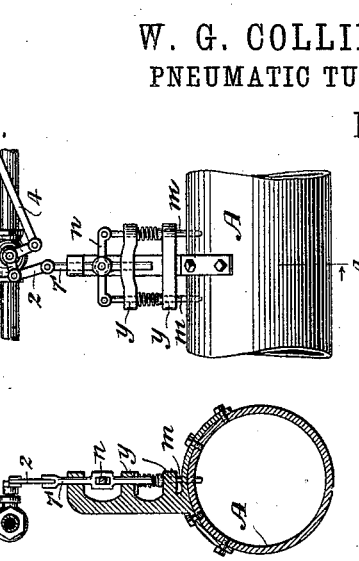
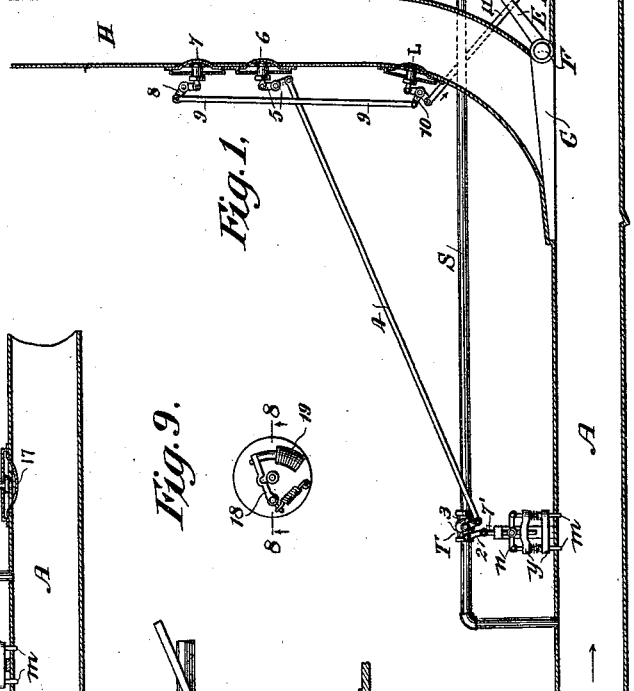
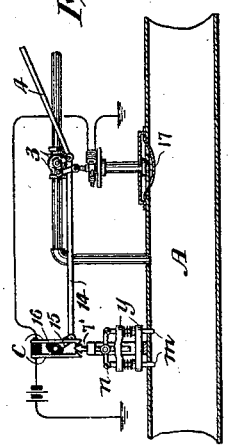
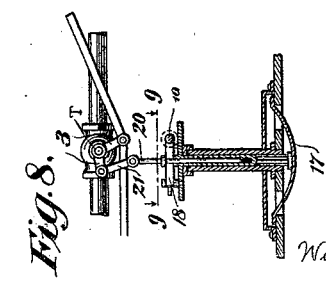
Witnesses
C. E. Ashley
I. H. W. Lloyd.
William Guy Collins Inventor
By his Attorneys
Witter & Kenyon

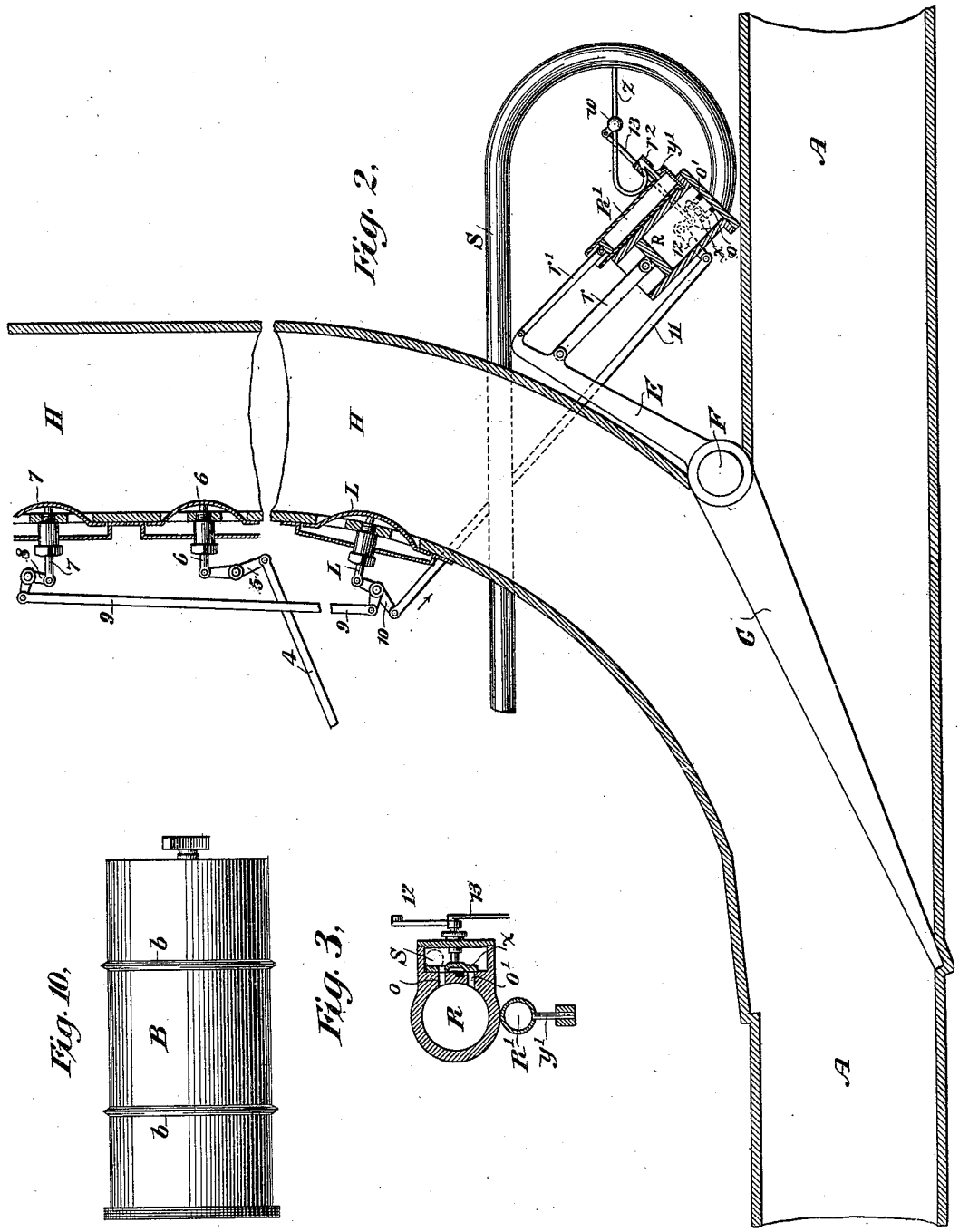

UNITED STATES PATENT OFFICE.

WILLIAM GUY COLLINS, OF NEW YORK, N. Y., ASSIGNOR, BY MESNE ASSIGNMENTS, TO THE COLLINS AUTOMATIC PNEUMATIC SWITCHING TUBES COMPANY, OF NEW JERSEY.

PNEUMATIC TUBE.

SPECIFICATION forming part of Letters Patent No. 555,077, dated February 25, 1896.

Application filed January 15, 1892. Serial No. 418,194. (No model.)

*To all whom it may concern:*

Be it known that I, WILLIAM GUY COLLINS, a citizen of the United States, residing at New York city, in the county and State of New York, have invented certain new and useful Improvements in Pneumatic-Tube Systems, of which the following is a full, clear, and exact specification, reference being had to the accompanying drawings, forming part hereof.

My invention relates to pneumatic tubes for carrying or sending objects by pneumatic pressure or suction, and has for its object to provide automatic means for switching the carriers into their proper branch tubes.

It consists in an improved apparatus for that purpose, the several parts of the invention being set forth in detail in the claims at the end of this specification. In order that they may be fully understood I have represented in the accompanying drawings and will now describe the form of apparatus which I prefer to use for the purpose and the mode of operation by its use.

Figure 1 represents a side view of my improved device, partly in section. Fig. 2 represents an enlarged side view, partly in section, of the main and branch tubes and their connections at and near their junction. Fig. 3 is a cross-section of the cylinders R and R'. Fig. 4 represents a vertical cross-section through the tube near the carrier-actuated rods *m m*. Fig. 5 shows a detailed side view of the said rods and cock T. Fig. 6 is a side view of the switch. Figs. 7, 8, and 9 show a modification of the mechanism for opening and closing the cock T. Fig. 10 is a view of the carrier.

In the apparatus shown in the drawings, A is a main tube, and H is a branch tube through which carriers are forced by air pressure or suction by any suitable means. At each angle formed by a branch tube with the main tube is pivoted a switch G. The switch preferably employed consists of a plate having in it an opening, as indicated in Fig. 6, with a pivot F and an extension-arm E. The surface of the switch which is toward the main tube, when the switch is in the position shown in Fig. 1, is preferably straight, thus forming when the switch is so closed a continuation of the wall of the main tube, so that in this position a carrier may freely pass on through the main tube past the switch. The opposite side of the switch is preferably inclined as shown in Figs. 1 and 2. A small recess is made in the opposite wall of the main tube, and in this the end of the switch lies when the switch is open, as shown in Fig. 2. The opening in the switch (shown in Fig. 6) is to enable the carrier to round into the branch tube without blocking the tube. The end of the carrier in turning first projects slightly through the said opening and then is withdrawn therefrom, as will be evident from an inspection of the drawings. The minor axis of the opening should be less than the diameter of the carrier to prevent the latter passing through the opening.

The construction of the switch just described also allows free circulation of air through both the main and branch pipes without regard to the position of the switch. The carrier consists of a cylindrical box B having around it metal bands *b b*. Each carrier is provided with such bands; but the distance between the bands on any carrier differs from the distance between the bands on other carriers intended to switch off into different branch tubes, as will be explained more fully hereinafter.

The extension-arm E of the switch is preferably made of the form shown in the drawings and has pivoted to it two piston-rods *r* and *r'*, one working in the larger cylinder R and the other in the smaller cylinder R'. A feed-pipe S runs from the main tube and opens into the larger cylinder R. The admission of air from said pipe into the cylinder and the discharge of air from said cylinder into the atmosphere are regulated by the valve *x*. (Shown in Figs. 2 and 3.) There are two openings into the larger cylinder R, the first one, *o*, (shown in Figs 2 and 3,) communicating with the feed-pipe S to let air into the cylinder R from the pipe S, the other, *o'*, communicating with the atmosphere to let air out from the cylinder R into the atmosphere. The valve *x* is actuated by the bell-crank 12 and the lever-arm 11, as will be explained more fully hereinafter. When the switch is in the position shown in Fig. 1, and while the piston-rod is being driven upward toward the position shown in Fig. 2, the valve $x$ does not cover the opening $o$, but does cover the opening $o'$. During this time, therefore, the air can pass from the feed-pipe S into the cylinder R, but cannot escape therefrom into the atmosphere. By the time the switch reaches the position shown in Fig. 2 the valve $x$ has been moved so as to close the opening $o$ and open that of $o'$, thus shutting off communication between the cylinder R and the feed-pipe S, but opening communication with the atmosphere, so that on the downstroke of the piston the air in the cylinder R can escape into the atmosphere.

The return of the switch to its normal closed position (shown in Fig. 1) is preferably accomplished by means of the smaller cylinder R' and the piston-rod $r'$. This cylinder R' has a short pipe $y'$ leading out into the atmosphere. Across the mouth of this pipe opens another pipe, $z$, which connects with and opens into the feed-pipe S, all as shown in Fig. 2. A cock $w$ on the pipe $z$ is opened and closed by the lever-arm 13. This cock $w$ is opened by the lever-arm 13 when the switch reaches the position shown in Fig. 2, and is closed when the switch is returned to its normal position, (shown in Fig. 1,) as will be more fully explained hereinafter.

The admission of air into the feed-pipe S from the main tube is controlled by the valve T. It is usually kept closed and is opened preferably by the devices shown in Fig. 1 and on an enlarged scale in Figs. 4 and 5.

$m\ m$ are two short rods pivoted to the cross-bar $n$ at its opposite ends and working in slots cut in the cross-bars $y\ y$. These rods $m\ m$ project into the main tube A far enough to be struck by the bands of a passing carrier, but not far enough to reach the main body of the carrier itself. To the center of the cross-bar $n$ is pivoted the rod $7'$, and to the upper end of this is pivoted the arm 2 and to that the bell-crank 3. To the other end of this bell-crank 3 is pivoted the lever-arm 4. (Shown in full in Fig. 1.) When one only of these carrier-actuated rods or points is struck, the bar $n$ is tilted a little, but the arms $7'$ and 2 are not pushed up or are pushed up so slightly that they do not open the cock T, but when both the points are struck at the same time and the rods $m\ m$ are thus both forced up together the arm 2, as is evident, opens the cock T and permits air to rush from the main tube through the pipe S. This cock T remains open until closed by the positive motion of the bell-crank and lever-arms 3, 4, 5 and 6. This operation is accomplished in the following manner: The rounded face or end of the arm 6 works in a round opening in the walls of the branch tube H and is capable of being projected forward slightly into the said tube and of being withdrawn therefrom by means of the bell-crank and arms 5, 4 and 3. When the cock T is closed the rounded face of the arm 6 does not project into the tube H, but when the cock T is opened it is thrown forward and projects slightly into the tube where it remains until the carrier in passing through the branch tube H strikes against it. This forces it and the arm 6 back out of the tube and through the bell-cranks, and arms 5, 4 and 3 closes the cock T.

The valve $x$ and cock $w$ are operated by the following devices: At a short distance beyond the switch in the branch tube H is a rod L, with a rounded end working in a short cylinder similar to 6, already described. The inner end of the arm is pivoted to the bell-crank 10. This bell-crank is pivoted at its center, and one of its arms is pivoted to the arm 9 and the third arm is pivoted to the arm 11. At a farther point on in the branch tube H there is another and similar rod 7, having a rounded end and working in a small cylinder, the inner end of the arm 7 being pivoted to the bell-crank 8, which is pivoted at its other end to the arm 9.

The mode of operation of my device is as follows: A carrier intended to be sent through the branch tube H is placed in the sender in the main tube A and forced in the usual way through that tube in the direction of the arrow. The two encircling-bands $b\ b$ on this carrier are placed at a distance apart from each other equal to that between the two rods or points $m\ m$, so that as the carrier passes these points the two bands will strike the points of both rods and be in contact therewith at the same time and force up the arms $n$, $7'$ and 2 and the bell-crank 3 and open the cock T. The air from the tube A then rushes into the cylinder R and drives out the piston $r$ and throws the switch into the position shown in Fig. 2, opening the branch tube H. The carrier then passes into the branch tube H and strikes the rounded end of the arm L and pushes it in, thus through the bell-crank 10 and the arms 9 and bell-crank 8 pushing out the rounded end of the arm 7 into the tube and at the same time through the arm 11 and bell-crank 12, causing the valve $x$ to close the opening $o$ from the air-pipe S into the cylinder R and to uncover the opening $o'$ from R into the atmosphere, and also at the same time through the arm 13 opening the cock $w$ in the pipe $z$. The air from S at once rushes through the pipe $z$ and is blown across the mouth of the opening $r^2$ leading from the small cylinder R'. This exhausts the air in the latter cylinder, producing a partial vacuum, which therefore causes the outside air to drive in the piston $r'$, thus bringing the switch to its normal closed position, (shown in Fig. 1,) the air in the larger cylinder R escaping on this downstroke through the opening $o'$ into the atmosphere. When the carrier strikes the rounded end of the arm 6 it drives it in and through the bell-crank 5 and the lever 4 and bell-crank 3 closes the cock T and at the same time pushes the points of the communicating rods $m\ m$ out into the tube A. When the carrier strikes the rounded end of the arm 7 it also drives it in and then through the bell-crank 8, the arm 9, the bell-crank 10 and the arm 11 and bell-crank 12, and the valve $x$ uncovers the opening $o$ and closes the opening $o'$, at the same time through the arm 13 closing the cock $w$ on the pipe $z$. The apparatus is now in its normal condition ready for the transmission of carriers through the main tube or of a similar carrier through the branch tube H.

Only one branch tube is shown in the drawings, but of course as many can be used as are required, the devices at each switch being exactly similar with those above described, except that the distance between the carrier-actuated rods and the bands on the carriers varies with each switch. In this way each carrier selects its appropriate branch tube and automatically operates the switch of that branch tube returning the switch to its normal position after it has passed through it.

In my Patent No. 460,081, granted to me September 22, 1891, I show a switch operated automatically by the carrier. I do not therefore in this application broadly claim automatic operation of a switch by the carrier; but in my said Patent No. 460,081 the switch was moved by magnetism or electricity, the carrier closing the circuit. In my present invention the switch is moved by air or any gaseous or liquid pressure, the carrier automatically operating a valve for that purpose. My present invention has some advantages over that of said Patent No. 460,081, among them being this, that with my improved apparatus I can use larger pneumatic tubes and heavier switches than in the former case.

The pressure to be used in the cylinder R to drive up the piston-rod $r$ and open the switch can, if desired, be taken from other sources than the main tube A and could be other pressure than that of air. Thus it could be steam or any gaseous pressure, or, if slow action on the part of the switch is not objectionable, even water or any liquid pressure, the valve supplying such gaseous or liquid pressure to the cylinder being controlled and operated automatically by the carrier, as described.

Any form of sender and receiver can of course be employed in my apparatus.

Figs. 7, 8 and 9 show a modification in the devices for operating the cock T. The carrier-actuated rods or points $m$ $m$ and arms $n$ and 7' are the same, except that the upper end of the arm 7' is shaped like the head of an arrow. When this is pressed up it forces apart the metallic spring-jaws $c$ $c$, which are fastened at their upper ends, and as these have catches on their lower ends the head of the rod 7' is caught and held up between the spring-jaws. A little distance on in the tube A projects slightly the rounded end of the rod 17, working in a cylinder. At the upper end of the cylinder is the electromagnet 19 and the armature 18, the latter swinging horizontally on a pivot. Immediately above the space between the electromagnet and the armature is the arm 20, pivoted to the arm 21, and that to the bell-crank 3. To the other end of said bell-crank 3 are pivoted the arm 4 and the arm 14. The latter is pivoted at its other end to the arm 15, and the latter is also pivoted at its other end and also carries the elliptical-shaped button 16, which is properly attached to work between the spring-jaws $c$ $c$. The operation of this modification is as follows: The appropriate carrier strikes the points of both of the rods $m$ $m$ at the same time, forcing up the rod 7' and separating the spring-jaws $c$ $c$ until they clasp and hold the head of the rod 7'. As soon as the head of the rod 7' comes into contact with the spring-jaws it closes the circuit of the electromagnet 19, as shown, and draws the lever 18 so that it rests between the rod 17 and the arm 20. The carrier then strikes the projecting rounded end of the rod 17, pushing the latter up. As the lever 18 now lies just above the top of the arm 17, this upward motion is communicated to the arms 20 and 21 and the bell-crank 3, thus opening the valve T. When the carrier has passed into the branch tube H and struck the rounded end of 6 it closes the cock T, as described above, and at the same time through the arms 14 and 15 turns the button 16 and thus forces the spring-jaws $c$ $c$ apart and releases the arm 7', when the carrier-actuated rods $m$ drop to their normal position, and the lever 18 is drawn back by the spring attached to its shorter arm into its normal position.

Certain parts of my apparatus which are shown in the drawings or described in the specification, but which are not claimed herein, are claimed in a certain other application filed by me simultaneously herewith under Serial No. 418,195.

What I claim as new, and desire to secure by Letters Patent, is—

1. The combination with a pneumatic tube having one or more branch tubes of a switch, a cylinder and piston-rod for actuating said switch, a pipe for supplying compressed air or other substance under pressure to said cylinder, a cock for controlling such supply and rods for opening said cock, projecting into the main tube adapted to be struck and automatically operated by carriers designed for the branch tube and by no others and rods for closing said cock projecting into the branch tube and adapted to be struck and automatically operated by carriers passing through the branch tube, substantially as shown and described.

2. The combination with a pneumatic tube having one or more branch tubes of a switch, a piston-rod secured to said switch and working in a cylinder and means automatically controlled by the carrier for exhausting the air from said cylinder and closing said switch, substantially as shown and described.

3. The combination with a pneumatic tube having one or more branch tubes, of a switch, a cylinder with a piston-rod secured to said switch, a pipe for supplying compressed air to blow across an opening from said cylinder and thereby produce a vacuum therein, a cock for controlling the supply of such compressed air and rods automatically actuated by the carrier projecting into the pneumatic tubes adapted to open and close said cock substantially as shown and described.

4. The combination with a pneumatic tube having one or more branch tubes, of a switch, a cylinder and piston-rod attached to said switch for opening the same, a pipe for supplying pressure to said cylinder and cocks regulating such supply automatically operated by the carrier, a cylinder and piston-rod also attached to said switch for closing the same and means for exhausting the air from said cylinder automatically controlled by the carrier, substantially as shown and described.

5. The combination with a pneumatic tube having one or more branch tubes, of a switch, a cylinder and piston-rod attached to said switch for opening the same, a pipe for supplying pressure to said cylinder and cocks regulating such supply, rods projecting into the pneumatic tubes automatically operated by the carrier for actuating said cocks, a cylinder and piston-rod also attached to said switch for closing said switch, another pipe to furnish compressed air to blow across a pipe opening from said cylinder to exhaust air from the latter, and a cock on said pipe to regulate such supply of compressed air automatically operated by the carrier substantially as shown and described.

6. The combination with pneumatic main tube A, branch tube H, and switch G at the junction of said main and branch tubes,—of rods $m$ $m$ projecting into said main tube so as to be operated by the carrier,—feed-pipe S having cock T actuated in one direction by the impact of the carrier upon said rods, and in the other direction by a device in connection with the branch tube acted upon also by the carrier,—cylinder R, having its piston in connection with the switch-lever and supplied with compressed air by said feed-pipe,—cylinder R' having its piston also connected with the switch-lever and exhausted by a blow-pipe $z$ supplied by said feed-pipe,—cock $w$ in said blow-pipe,—and valve $x$ controlling inlet and outlet of said cylinder R,—levers 13, 12, 11 for operating said valve and cock simultaneously,—and devices connecting said lever 11 with projections in the branch tube adapted to be struck and operated by the carrier to shift said valve $x$ and close said cock $w$, substantially as described and shown.

7. In combination with a switch in pneumatic tubes, a cylinder and piston-rod for opening such switch, a pipe for admitting compressed gas or liquid to said cylinder, a cock for regulating such admission and carrier-actuated rods projecting into the tube and automatically operated by the carrier for opening said cock, substantially as shown and described.

8. In combination with a switch in pneumatic tubes, an exhaust-cylinder and piston-rod for closing said switch, an opening from said cylinder, and a pipe supplying compressed air to blow across said opening, a cock automatically controlled by the carrier for regulating such supply, substantially as shown and described.

9. In combination with a switch in pneumatic tubes, a cylinder and piston-rod for opening said switch, and means for supplying compressed air, gas or liquid to said cylinder automatically controlled by the carrier, an exhaust-cylinder and piston-rod for closing said switch and means for exhausting the air from said cylinder, automatically controlled by the carrier, substantially as shown and described.

10. In combination with a carrier and switch in a pneumatic tube two carrier-actuated rods projecting into the tube, a cock for regulating the supply of pressure to move the switch, and arms connected to said rods for opening said cock when both carrier-actuated rods are struck at the same time by the bands of a carrier, substantially as shown and described.

11. In a pneumatic tube the cock T controlling the supply of compressed air to operate the switch, carrier-actuated rods $m$ $m$, cross-bar $n$ and connections between the same and the cock T whereby the said cock is operated when said rods are struck by a carrier, substantially as set forth.

12. In a pneumatic tube having a branch tube the cock T controlling the supply of compressed air or liquid, rod 6 projecting into the branch tube and connecting arms and levers arranged to close the cock T when the rod 6 is struck by the carrier substantially as shown and described.

13. In a pneumatic tube having a branch tube the rod L projecting into the branch tube, the cylinder R, provided with inlet-opening $o$ and exhaust $o'$, cock $w$ on the exhaust-pipe $z$, the valve $x$, and connecting levers and arms to close the opening $o$ and uncover the opening $o'$ and open the cock $w$ when the rod L is struck by the carrier, substantially as shown and described.

14. In a pneumatic tube having a branch tube the rod 7 projecting into the branch tube, the cylinder R, provided with inlet-opening $o$ and exhaust $o'$, cock $w$ on the exhaust-pipe $z$, the valve $x$ and connecting levers and arms to uncover the opening $o$, and close the opening $o'$ and the cock $w$ when the rod 7 is struck by the carrier substantially as shown and described.

W. GUY COLLINS.

Witnesses:
SAMUEL S. HADDEN,
HERBERT H. GIBBS.